United States Patent [19]

Szerdahelyi et al.

[11] Patent Number: 5,033,236
[45] Date of Patent: Jul. 23, 1991

[54] MOTOR VEHICLE DOOR

[75] Inventors: Ferenc Szerdahelyi, Coburg-Neuses; H. Peter Hess, Coburg; Rolf Heinemann, Grossalmerode; Klaus Leidner, Jesserndorf, all of Fed. Rep. of Germany

[73] Assignee: Brose Fahrzeugteile GmbH & Co. KG, Coburg, Fed. Rep. of Germany

[21] Appl. No.: 544,327

[22] Filed: Jun. 27, 1990

[30] Foreign Application Priority Data

Jun. 29, 1989 [DE] Fed. Rep. of Germany ....... 3921289

[51] Int. Cl.$^5$ ................................................. B60J 5/04
[52] U.S. Cl. ...................................... 49/502; 280/730; 296/188
[58] Field of Search ......................... 49/502, 503, 501; 296/188, 905, 152, 146; 280/730

[56] References Cited

U.S. PATENT DOCUMENTS

| 3,819,228 | 6/1974 | Cornacchia | 296/188 X |
|---|---|---|---|
| 3,887,227 | 6/1975 | Deckert | 296/188 |
| 3,981,518 | 9/1976 | Pulling | 280/730 |
| 4,293,160 | 10/1981 | Lutze et al. | 296/146 |
| 4,648,208 | 3/1987 | Baldamus et al. | 49/502 |
| 4,711,052 | 12/1987 | Maeda et al. | 49/502 |
| 4,866,883 | 9/1989 | Brown et al. | 49/502 |
| 4,905,412 | 3/1990 | Srock et al. | 49/352 |
| 4,919,473 | 4/1990 | Laimighofer et al. | 49/502 X |
| 4,920,697 | 5/1990 | Vail et al. | 49/352 X |
| 4,934,099 | 6/1990 | Maekawa et al. | 49/502 X |

FOREIGN PATENT DOCUMENTS

| 2836213 | 2/1980 | Fed. Rep. of Germany . |
|---|---|---|
| 3209052 | 9/1983 | Fed. Rep. of Germany . |
| 3217640 | 11/1983 | Fed. Rep. of Germany . |
| 3718767 | 12/1987 | Fed. Rep. of Germany . |
| 2191156 | 6/1987 | United Kingdom . |
| 2220620 | 1/1990 | United Kingdom ................. 280/730 |

Primary Examiner—Philip C. Kannan
Attorney, Agent, or Firm—Fish & Richardson

[57] ABSTRACT

Motor vehicle door 1 with an integrated lattice-type support frame 2 receiving a window lifter. Support frame 2 is mountable in motor vehicle door 1 connected by hinges 36 and 37 with a passenger compartment of a motor vehicle. At least one support 3, 4 of support frame 2 is connected at its connecting ends 45 and 46 with force inleads 47 and 48 disposed in motor vehicle door 1, said inleads being in positive contact with areas of the passenger compartment which are adjacent on both sides with motor vehicle door 1 (FIG. 5).

18 Claims, 8 Drawing Sheets

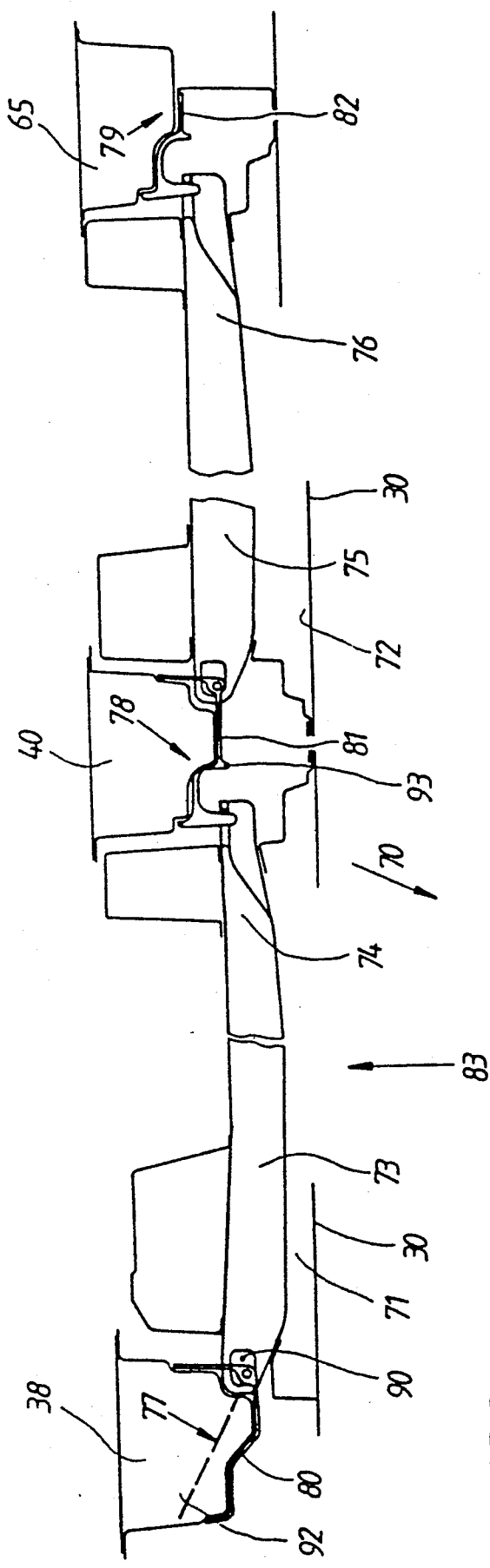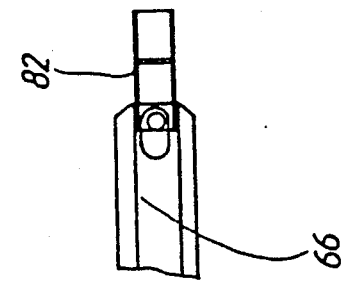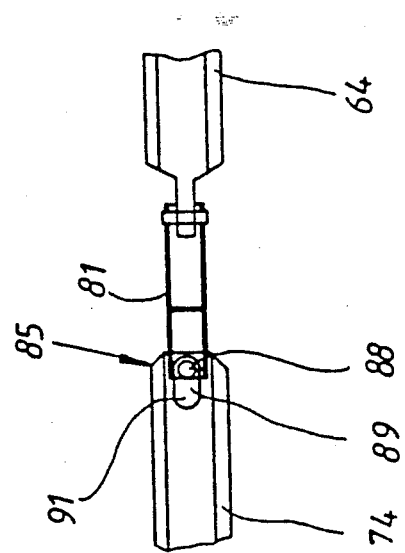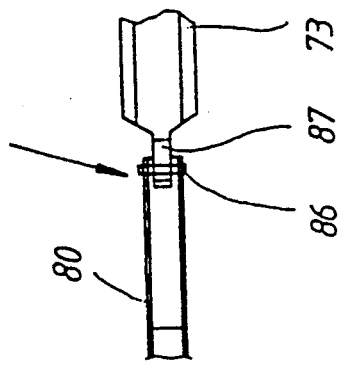
FIG.2a
FIG.2b

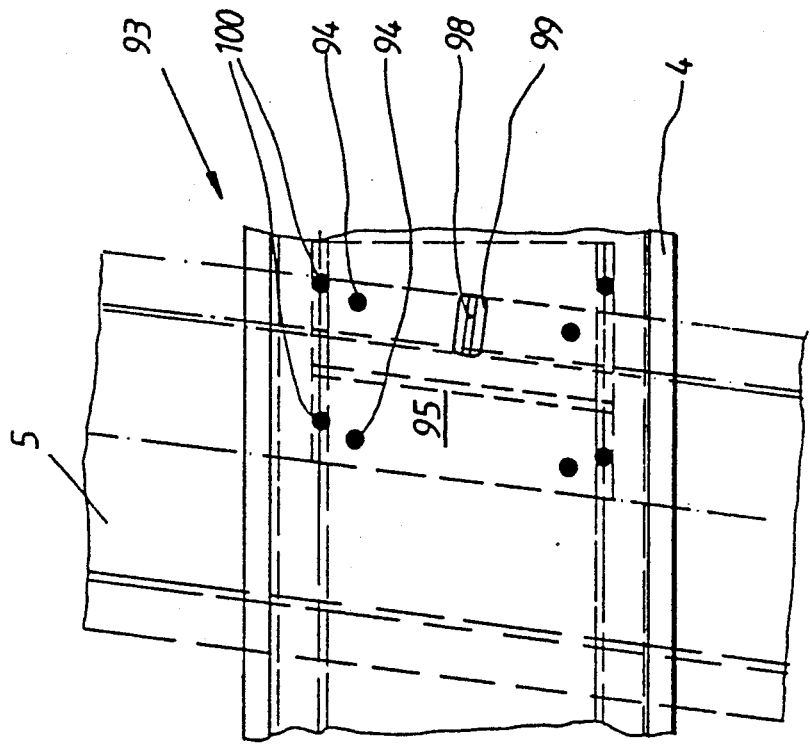
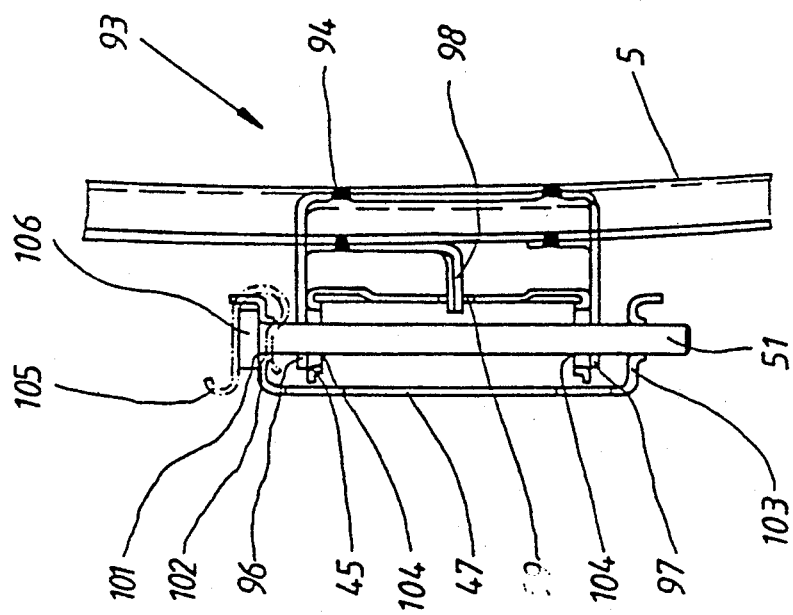

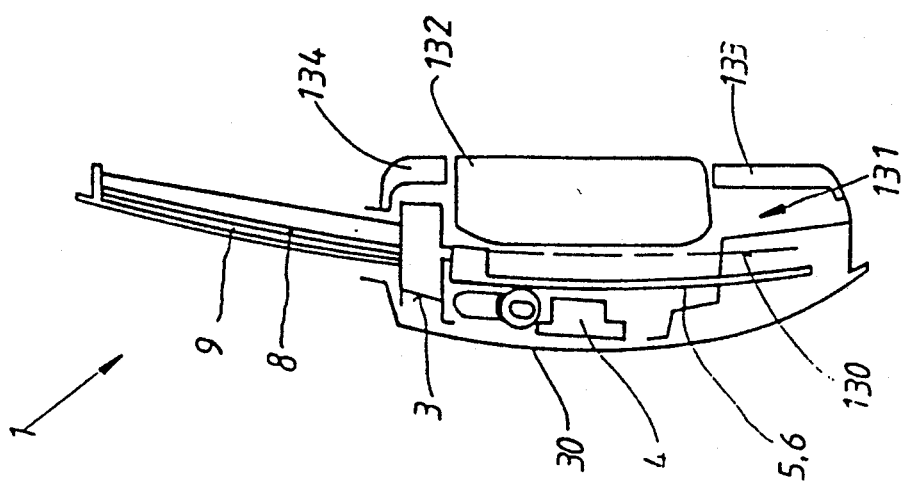
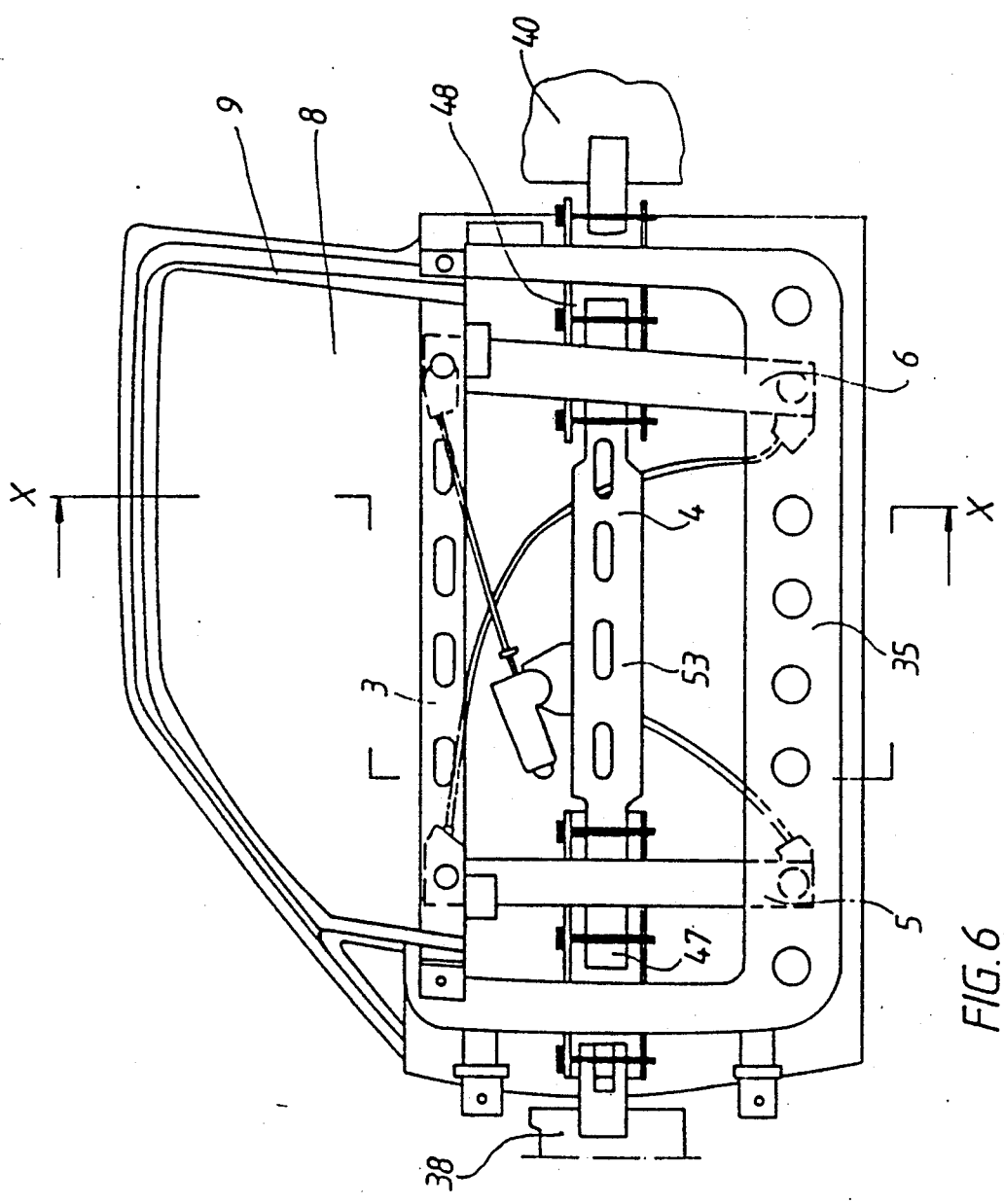

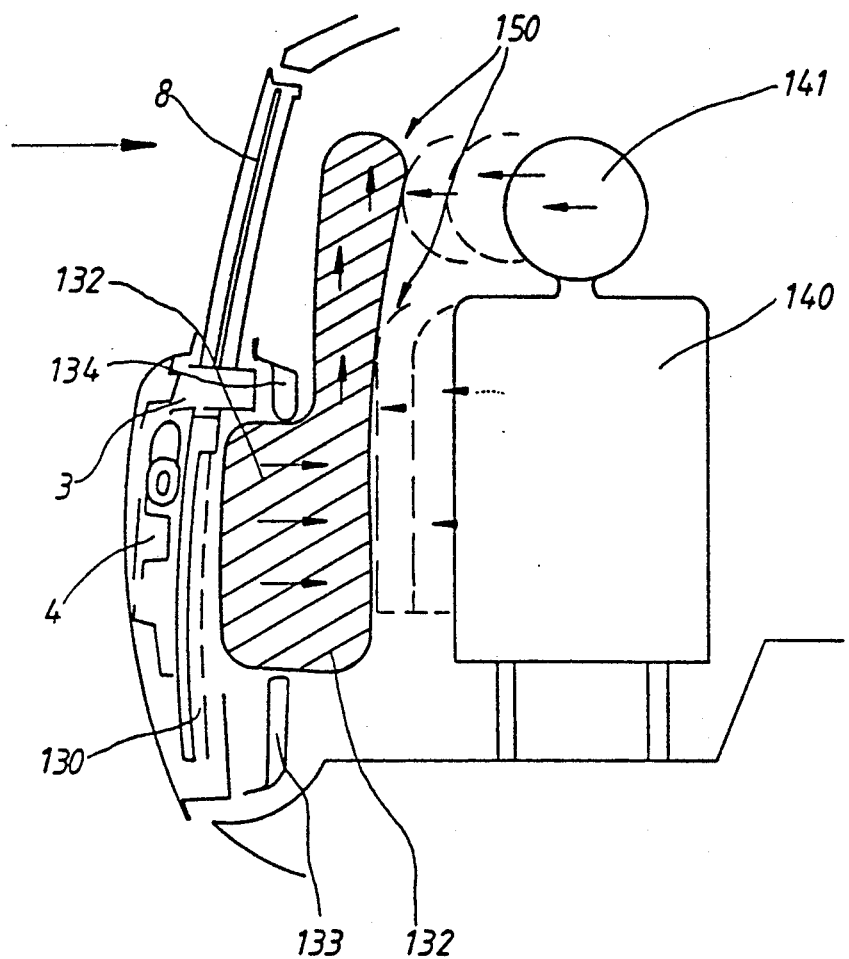
FIG. 8
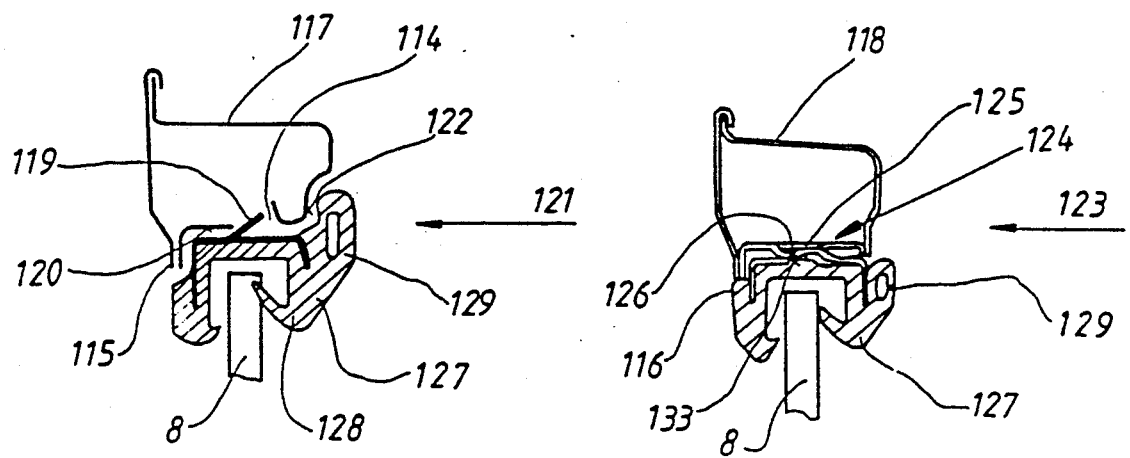
FIG. 9
FIG. 10

MOTOR VEHICLE DOOR

The invention relates to a motor vehicle door.

It is known that motor vehicle doors, made light-weight and composed of sheet steel or plastic, can be provided with a reinforcing support frame, said frame serving to increase the stability of the motor vehicle door, in order better to protect the vehicle occupants against accident-related injuries, and to receive door components, for example the window lifter, whose actuation assumes stable mounting.

For reasons related to the least expensive method of manufacture, it is especially important in designing such support frames that they be integrated in an especially simple manner without disadvantageous effects on the assembly process during motor vehicle manufacture, into the motor vehicle doors.

German No. 32 17 640 A1 teaches a motor vehicle door composed of an outer skin, a door frame with a box profile, an assembly carrier with horizontal reinforcing tubes, an inner lining, and a window frame mounted on the door frame, as well as a window pane. The motor vehicle door is connectable by hinges to a passenger compartment.

Despite the fact that the motor vehicle door has an outer skin and inner skin of a light-weight design made of sheet steel or plastic, by means of the assembly support, itself made rigid or provided with reinforcing elements, following the assembly of the outer skin and the assembly support designed as an inner wall or following the assembly of the outer skin, assembly support, and inner lining, a stable door body is created. In addition, the assembly support performs the function of reinforcing the side flank of the passenger compartment, in which it serves as a fastening base for the door hinges and as a fastening base for the latching mechanism of a door lock on the door, so that when the doors are locked, lateral impact forces are transmitted by the rigid assembly carriers directly into the two door pillars on both ends of the door. Similarly, frontal impact forces are carried away through the door pillars and the rigid assembly supports.

The two reinforcing tubes of the assembly support are connected for this purpose by their connecting ends with connecting tabs disposed in the motor vehicle door by means of threaded bolts, producing a rigid connection between the connecting tabs and the reinforcing tubes. The multiply bent connecting tabs are permanently integrated into the door frame and form a direct positive connection between the initiation of the forces and the areas of the passenger compartment delimiting the motor vehicle door on both sides. The result is an easily mounted motor vehicle door with low weight and high stability, in which lateral and frontal impact forces are conducted directly into the body pillars.

German OS No. 37 18 767 teaches a motor vehicle door with a lattice-type support frame integrated therein, said frame forming the actual body of the motor vehicle door. The support frame is composed of two horizontal supports running parallel which are connected together by the legs of a U-shaped profile strip serving as the window frame. The two horizontal supports of the support frame serve to receive a window lifter as well as other components required to operate the vehicle door. By installing an inner and an outer covering, the support frame is finished to form a motor vehicle door. The motor vehicle door is connected to the passenger compartment by hinges connected with the long ends of the supports.

The known motor vehicle door, because of the use of the support frame as a body element which is connected directly by hinges to the passenger compartment, does not allow assembly of the motor vehicle door to the passenger compartment of a motor vehicle independently of the support frame. This is a prerequisite however for inexpensive and simple assembly of the motor vehicle door composed of components from the motor vehicle manufacturer himself and parts from suppliers in modular fashion during the assembly of a motor vehicle.

In addition, the protection for the occupants which can be achieved by the support frame integrated into the motor vehicle door is incomplete because, for lack of positive integration of the support frame into the passenger compartment, only the rigidity of the support frame can be used to protect the occupants during a side crash or side impact of the motor vehicle, and the rigidity of the passenger compartment remains unused. The goal of the present invention is to provide a motor vehicle door of the species recited at the outset which makes possible the incorporation of a support frame which increases the rigidity of the motor vehicle door in the lengthwise and transverse directions without a design change in the door frame or passenger compartment receiving the motor vehicle door.

The solution according to the invention provides for an increase in the stability of a motor vehicle door by providing a support frame which stiffens the motor vehicle door to carry away directly the lateral or frontal impact forces into the body pillars without the articulation points of the door on the body pillars having to be changed. Using adapters at the end of a tension and compression strip thus permits positive articulation of the conduction of the forces to the conventional pillars of a motor vehicle compartment.

The stiffening of the passenger compartment by the support frame is accomplished by virtue of the fact that one support of the support frame is held at its long ends by the force "inleads" provided in the motor vehicle door, which are in positive contact with the pillars of the passenger compartment delimiting the door cutout in the passenger compartment. The motor vehicle door is provided with hinges that permit assembly of the motor vehicle door on the motor vehicle or the passenger compartment independently of the support frame.

According to one advantageous improvement, the force inlead disposed at the hinges in the motor vehicle door is pivotably connected with the adapter in the end area that faces the pillar.

Firstly, the pivotable articulation permits safe, positive connection of the force inlead with the adapter, and secondly the pivoting movement of the motor vehicle door permitted by the hinges is not limited.

Advantageously, the adapter has a fastening part adapted to the cross section of the pillars, said part being provided at its end area facing the motor vehicle door with a pivot pin mounted at both ends and extending vertically, said pin being mounted flush with a hinge axis of the motor vehicle door formed by the hinge joint. Thus, use of the articulated pin for a positive connection of the adapter with the force inlead is possible in any pivoted position of the motor vehicle door which is connected by the hinge with the passenger compartment. Installation of the support frame is thus considerably simplified.

According to another advantageous feature of the invention, the end area on the hinge side of the force inlead has two parallel horizontal pivot eyes, pivotable about a pivot pin mounted on both sides in the adapter. This produces a non-tilting connection of the force inlead with the adapter, which is capable of accepting the tilting moments acting on the tension and compression strip as the result of a crash.

According to one advantageous improvement, the force inlead located on the lock side in the motor vehicle door is linked in its end area facing the pillar by a positive connection releasable in the door opening direction with the adapter, said adapter having a fastening part matching the cross section of the pillar, said part being provided in its end area facing the motor vehicle door with a pin aligned in the door opening direction. The end area of the force inlead on the other hand has a retaining eye directed perpendicularly to the pin, said eye receiving the pin of the adapter when the vehicle door is closed. This special design of the interlocking areas of the adapter and the conducting of force inward ensures that when the motor vehicle door is closed there is a positive involvement of the support frame by means of the tension and compression strip in the motor vehicle compartment which is taken up by the force inleads.

In an alternative embodiment of the adapter, the latter has in its end area opposite the pin, a pivot pin which is mounted at both sides and aligned perpendicularly. This design for the adapter makes it possible in the case of a four-door vehicle, to provide the rear side motor vehicle door with a support frame integratable into the passenger compartment as well, and to connect it on the hinge side with the additional pivot pin of the adapter mounted on the pillar. The connection on the lock side of the support frame integrated into the rear side motor vehicle door with the rear pillar of the passenger compartment, is then accomplished by means of an adapter provided with only one pin.

According to one advantageous improvement on the invention, the support frame is composed of two supports running lengthwise of the door, an upper cross member and the tension and compression strip, which are connected with the guide rails, disposed at a distance from one another, of a double cable window lifter system in a reinforcing manner, whereby the guide rails which serve to guide a window pane disposed in the motor vehicle door are so arranged that they form the limit to the support frame directed toward the passenger compartment.

Using the guide rails as an integral component of the support frame permits construction of a reinforcing lattice structure with the smallest possible number of additional parts. In addition to the guide rails of the double cable window lifter system which are in any case required for the motor vehicle door, only two supports for installation of the reinforcing support frame are required. In addition, the result is a spatial arrangement of the support frame between the plane of the window pane and the exterior skin of the door, so that despite integration of the support frame into the motor vehicle door, use of the door interior between the plane of the window pane and an inner lining for the door is left as storage space or to accommodate safety cushions.

An advantageous improvement on the solution according to the invention is characterized by the fact that the support frame is designed as a net with a lattice structure and is disposed in the area between the window pane of the motor vehicle door and the outer skin of the door, in such a manner that the support frame immediately takes up the impact forces after a lateral impact, with the interior of the door between the window pane, the motor vehicle door, and the inner lining of the door and/or the frame structure containing an elastically deformable occupant protection device, said device consisting of an inflatable cushion or airbag which is preferably so designed that in addition to increasing its cross section in the direction of the occupants, a portion of the elastically deformable occupant protection device, in the case of a side impact, expands in the direction of the window pane of the motor vehicle door.

By designing the support frame as a net with lattice structure and placing the support frame outward between the outer skin of the door and the window pane, in other words by creating a wide space between the seated position of a motor vehicle occupant and the support frame, assurance is provided that the support frame will participate in energy reduction early on, in other words will receive the impact like a net, ensuring the maximum degree of occupant protection. The space-saving design of the support frame makes it possible to include cushions to protect the occupants inside the motor vehicle door. This prevents metal components from being inside the door which could cause serious injuries to the occupants on impact as a result of the reactive forces and inertia.

Using inflatable cushions or an airbag can provide additional energy-absorbent measures which protect the occupants effectively. Using inflatable cushions or an air bag will increase the effective cross section and also, by extending this occupant protective device toward the window pane of the motor vehicle door, create a situation in which the head area of an occupant is protected against glass splinters and is also caught by the inertial forces.

According to one advantageous feature of the invention, a positive claw connection is provided to link the upper cross member and the tension and compression strip with the guide rails of the double cable window lifter system, said connection preferably consisting of claw elements connected with the guide rails, said claws engaging corresponding openings in the upper cross member and the tension and compression strip or fitting around the upper cross member and the tension and compression strip. This permits reliable positioning of the structural elements of the support frame to be connected with one another and creates a connection which can withstand major loads due to its structural integrity.

In a preferred embodiment of the invention, the support frame is supplemented by a sealing frame abutting its upper cross member for integration of a window pane located in the motor vehicle door and connected with the double cable window lifter system. The support frame is therefore an integral component of an installation module which includes the window lifter system completed by the window pane. The sealing frame provides for reliable guidance of the window pane over the entire adjustment range of the window lifter system and simultaneously provides additional reinforcement of the support frame.

The invention will now be described in greater detail with reference to the embodiments shown in the drawing:

FIG. 2a is a partial cross section of the lateral area of a passenger compartment with a top view of the tension and compression strips connecting the pillars of the passenger compartment together, said strips being associated with support frames installed in a front and rear side door;

FIG. 2b is a side view of the side area of the passenger compartment shown in FIG. 2a;

FIG. 3 is a cross section through a claw connection of a guide rail of a double cable window lifter system with the tension and compression strip of the support frame;

FIG. 4 is a side view of the claw connection shown in FIG. 3;

FIG. 6 is a side view of the motor vehicle door to make the net connection evident using the claw principle on both sides;

FIG. 7 is a cross section through the motor vehicle door shown in FIG. 6 along line X—X;

FIG. 8 is a schematic diagram showing a cross section through the motor vehicle door during a side impact with an inflatable cushion or airbag integrated into the motor vehicle door;

FIG. 9 is a cross section through a sealing frame connected with a window frame with a motor vehicle door, said sealing frame being part of the support frame;

FIG. 10 is another embodiment of the connection of the window frame with a sealing frame;

FIG. 1 is an exploded view of a motor vehicle door 1 with a support frame 2 installable therein.

Figure 1:
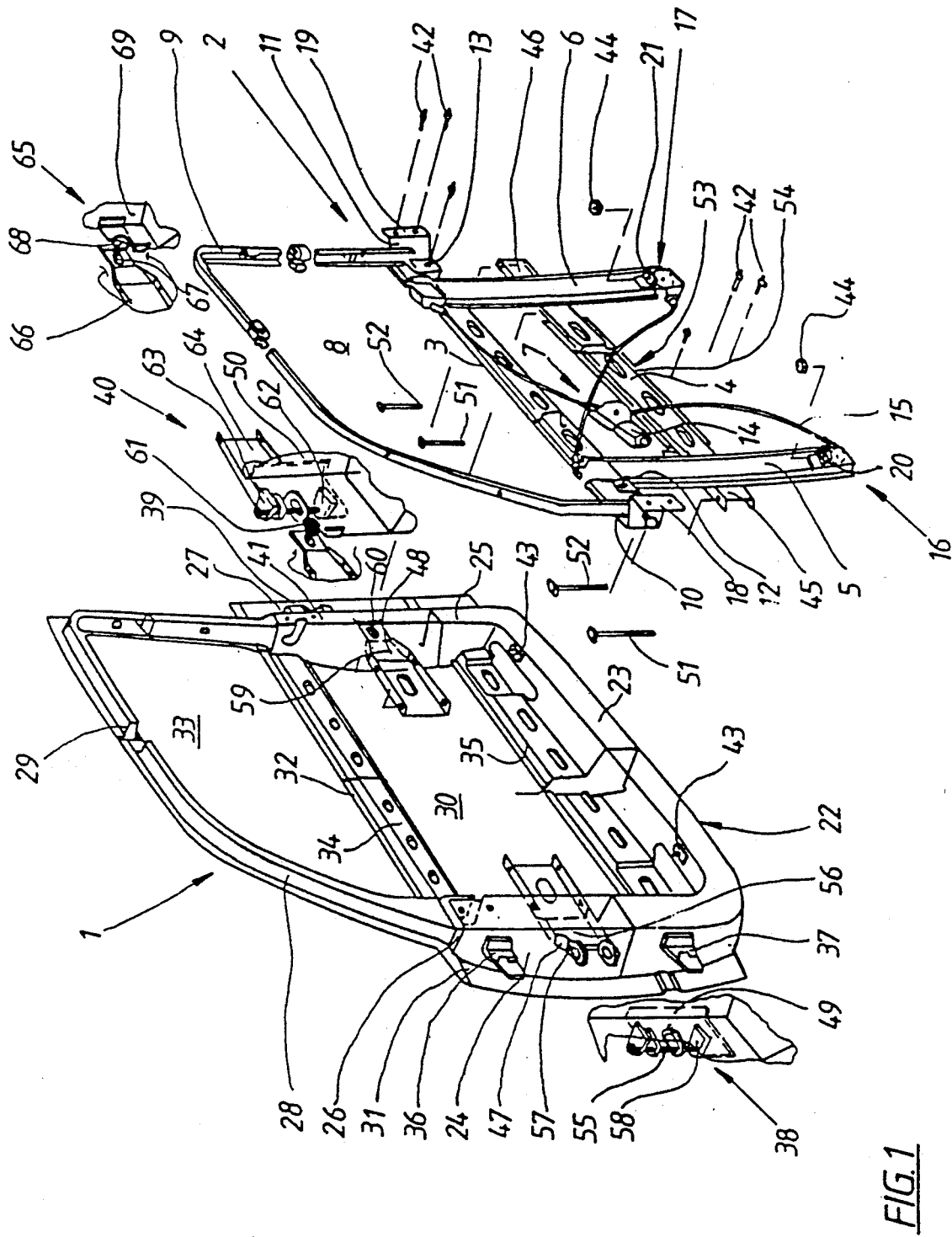
FIG. 1 is an exploded view of a motor vehicle door provided with a support frame, with articulation of the support frame on the pillars of the passenger compartment laterally abutting the motor vehicle door.

Support frame 2 has a lattice-like structure and is composed of two parallel supports arranged horizontally, an upper cross member 3, and a tension and compression strip 4 which are connected together by guide rails 5 and 6, running crosswise and parallel, of a double cable window lifter system 7. To receive and guide a window pane 8, a sealing frame 9 extending in the shape of a U with a U-shaped cross section is connected with end areas 10, 11 on the long side of upper cross member 3. For vertical displacement, window pane 8 is connected with dogs 12 and 13 guided lengthwise in guide rails 5 and 6, said dogs being displaceable by means of an endless cable 15 drivable by a drive unit 14, along guide rails 5 and 6.

To connect support frame 2 with motor vehicle door 1, upper cross member 3 is provided in its end areas 10, 11 and guide rails 5 and 6 are provided at their long ends 16 and 17 facing the floor of the motor vehicle, with mounting tabs 18 and 19 and 20 and 21 respectively.

Motor vehicle door 1 essentially consists of a U-shaped frame structure 22 with a base member 23 running horizontally and leg members 24 and 25 connected laterally and perpendicularly thereto, the ends 26 and 27 of said leg members blending with an essentially U-shaped window frame 28. Window frame 28 as well as frame structure 22 have an essentially U-shaped open profile 29, which is formed into a closed profile by connection with a door outer skin 30. To reinforce a lower edge 32 of a window cutout 33 in motor vehicle door 1 as well along base member a reinforcing panel 34 connected to door outer skin 30 and running horizontally as well as a lower cross member 35 are provided.

The pivotable articulation of motor vehicle door 1 to the passenger compartment, not shown here in greater detail, is by hinges 36 and 37 which are connected both with member 24 and with a motor vehicle A pillar 38 of the passenger compartment shown in parts and located close by.

Motor vehicle door 1 is locked to the passenger compartment by a door lock 39 connected with leg member 25 said lock engaging in a manner known of itself, a locking pin not shown here in greater detail, on the B pillar 40 of the passenger compartment adjacent to leg member 25.

For a positive connection of support frame 2 with motor vehicle door 1, members 24 and 25 have at their ends 26 and 27, two threaded holes 41 which are screwable by screws 42 with mounting tabs 18 and 19 of upper cross member 3. On the top of base member 23 there are two threaded bolts 43 which are screwed along with mounting tabs 20 and 21 to the free ends of guide rails 5 and 6 by nuts 44.

For articulation according to the invention of connecting ends 45 and 46 of tension and compression strip 4 on A pillar 38 and B pillar 40, force inleads 47 and 48 are provided which pass through members 24 and 25 of motor vehicle door 1 and are positively connected with the passenger compartment by means of adapters 49 and 50 which are permanently attached to A pillar 38 and B pillar 40.

Force inleads 47 and 48 are connected to connecting ends 45 and 46 of tension and compression strip 4 by, in each case, two parallel and spaced bolts 51 and 52. By spacing bolts 51 and 52 away from one another, a wide base is created between tension and compression strip 4 and force inleads 47 and 48 which, because of the relatively great connecting length, produces both a torsional resistant and bending resistant connection.

Both force inleads 47 and 48 and connecting ends 45 and 46 have a C profile that faces the opening side, so that a torsion resistant and bending resistant closed box profile is formed in the connecting area. In a middle area 53, a closed profile is created by joining of the C profile of the tension and compression strip 4 with a reinforcing panel 54.

The hingewise connection of force inlead 47 with adapter 49 is accomplished by means of a pivot pin 55. One hingeside end area 56 of force inlead 47 has two parallel and horizontal pivot eyes 57, through which pivot pin 55 mounted in two cheeks 58 of adapter 49 is passed. The lock-side articulation of force inlead 48 on adapter 50 connected with B pillar 40 is by means of a connecting eye 60 mounted perpendicularly in end area 59 of force inlead 48, said eye receiving a pin 61 connected with adapter 50 and running horizontally.

In addition to the pin connection by connecting eye 60 and pin 61, adapter 50 shown in FIG. 1 and connected with B pillar 40 has a pivot pin 63 mounted in cheek 62, said pin serving for connection with an additional force inlead 64 disposed in a rear motor vehicle door not shown here in greater detail. For a lock-side connection of the motor vehicle door with a rear C pillar 65, a force inlead 66 is connected by the above-described pin connection composed of a mounting eye 67 and a pin 68, with an adapter 69. In a motor vehicle equipped with only two side doors, the adapter 69 shown in FIG. 1 is connected with B pillar 40 instead of C pillar 65 of the passenger compartment.

FIGS. 2a and 2b show in detail one possible embodiment of the articulation of force inleads 73, 74, 75, 76 in pillars 38, 40, and 65 of a passenger compartment of a motor vehicle.

Between A pillar 38 and B pillar 40 or B pillar 40 and C pillar 65, a motor vehicle door 71, 72 is disposed, whose opening direction is indicated by arrow 70. To articulate force inleads 73 to 76, pillars 38, 40, and 65 are provided with adapters 77, 78, and 79 each of which has one fastening part 80, 81, or 82, which is permanently connected to pillars 38, 40, and 65 and adapted to their cross-sectional shape.

Force inleads 73 and 74 and 75 and 76 which are connected directly together by tension and compression strips not shown here, permit a force flow pattern 92 indicated by the dashed lines in the side area of the passenger compartment.

During the action of lateral forces, for example in the vicinity of front motor vehicle door 71, as a result of a lateral impact for example, tension and compression strip 4 together with force inleads 73 and 74 is deformed and subjected to tension. The resultant internal stress is conducted into the passenger compartment or the A pillar 38 and B pillar 40 through a bolt connection 84 with adapter 77 and a pin connection 85 with adapter 78. The positive connection of the force inleads 73 and 74 with the passenger compartment thus makes it possible to utilize the structural rigidity of the passenger compartment to reduce the deformations in the vicinity of motor vehicle door 71.

Pin connection 84 consists of a pivot pin 86 received by adapter 77, said pin being guided through a pivot eye 87 of force inlead 73. Pin connection 85 has a pin 88 connected integrally with mounting part 81 of adapter 78, said pin being received by a mounting eye 89 of force inlead 74.

Both pivot eye 87 and mounting eye 89 have a much larger recess 90, 91 to receive pivot pin 86 and/or pin 88 by comparison to the diameter of pivot pin 86 or pin 88. Pivot pin 86 and pin 88 are arranged in recesses 90, 91 in such manner that they are in contact only with a relatively small circumferencial area facing pillars 38 and 40 with the hole edges of recesses 90 and 91.

Consequently, even with relatively minor deformation of tension and compression strip 4 in the direction of arrow 83, force flow 92 via bolt connection 84 and pin connection 85 into the passenger compartment takes place, and this is therefore involved in the reduction of the load acting from the outside onto motor vehicle door 71 and also as a result of the relatively small contact area, especially between pin 88 and the edge of the hole of mounting eye 89, even after severe deformation of tension and compression strip 4, it is still possible to open motor vehicle door 71 in the direction of arrow 70, since only relatively low clamping forces can act in the small contact area.

Easy opening of deformed motor vehicle door 71 is also provided by a convex design of the hole edge of mounting eye 89 and a wedge-shaped design of pin 88 which tapers in the opening direction of motor vehicle door 71.

As is clearly evident from FIG. 2a, force inleads 73, 74, 75, and 76 are crimped in the vicinity of their articulation on pillars 38, 40, and 65, so that they bulge out in the direction of the door outer skin 30 of motor vehicles doors 71 and 72. This produces the maximum possible distance of the side protection for the motor vehicle occupants created by tension and compression strip 4, so that even major deformations in the door area are possible without endangering the occupants.

In the event of a frontal impact on the motor vehicle, tension and compression strip 4 together with force inleads 73 to 76 act as elements to reinforce the passenger compartment of the motor vehicle. The tension and compression strip 4 as well as force inleads 73 to 76 are subjected to pressure whereupon the force flow pattern 92 shown in FIG. 2a occurs following an initial deformation of the passenger compartment.

This deformation causes pivot pin 86 and pin 88 to come in contact in opposing contact areas, with the hole edges of pivot eye 87 and mounting eye 89, thus creating force inleads 73 and 74 and 75 and 76 and adapters 77, 78 and 78, 79 as a result of pressure stress. In order to be able to eliminate the force flow between pin 88 and mounting eye 89 as a result of a component failure of pin 88 during an extreme load caused by a frontal impact, a support nose 93 is provided on adapter 78 which then takes over the function of pin 88.

FIGS. 3 and 4 show an embodiment for the positive connections between guide rails 5 and 6 of double cable window lifter system 7 with upper cross member 3 and tension and compression strip 4 by means of a claw connection 93 between guide rail 5 and tension and compression strip 4 in the vicinity of force inlead 47 on the motor vehicle door 1 shown in FIG. 1.

Claw connection 93 has a claw part 95 connected with guide rail 5 by spot welds 94, said claw part fitting around tension and compression strip 4 with two parallel legs 96 and 97 and penetrating with a projection 98 into a recess 99 in tension and compression strip 4. Claw connection 93 is secured by spot welds 100 which link legs 96, 97 of claw part 95 with tension and compression strip 4.

This special design of claw connection 93 permits rapid economical assembly of support frame 2, since by simply fitting guide rail 5 and tension and compression strip 4 together, the components are reliably positionable with respect to one another and are reliably lockable with respect to one another only by welding at spot welds 100 in the vicinity of the two legs 96, 97 of the claw part.

FIG. 3 also shows the connection of force inlead 47 with connecting end 45 of tension and compression strip 4. Here, pin 51 is passed through receiving holes 101 in two parallel legs 102 and 103 of force inlead 47, and, through two holes 104, receives the connecting end 45 of tension and compression strip 4 located between legs 102 and 103. Pin 51 is secured by a spring clip 105 which presses a pin head 106 of pin 51 by its contact surface against leg 102.

Figure 5:
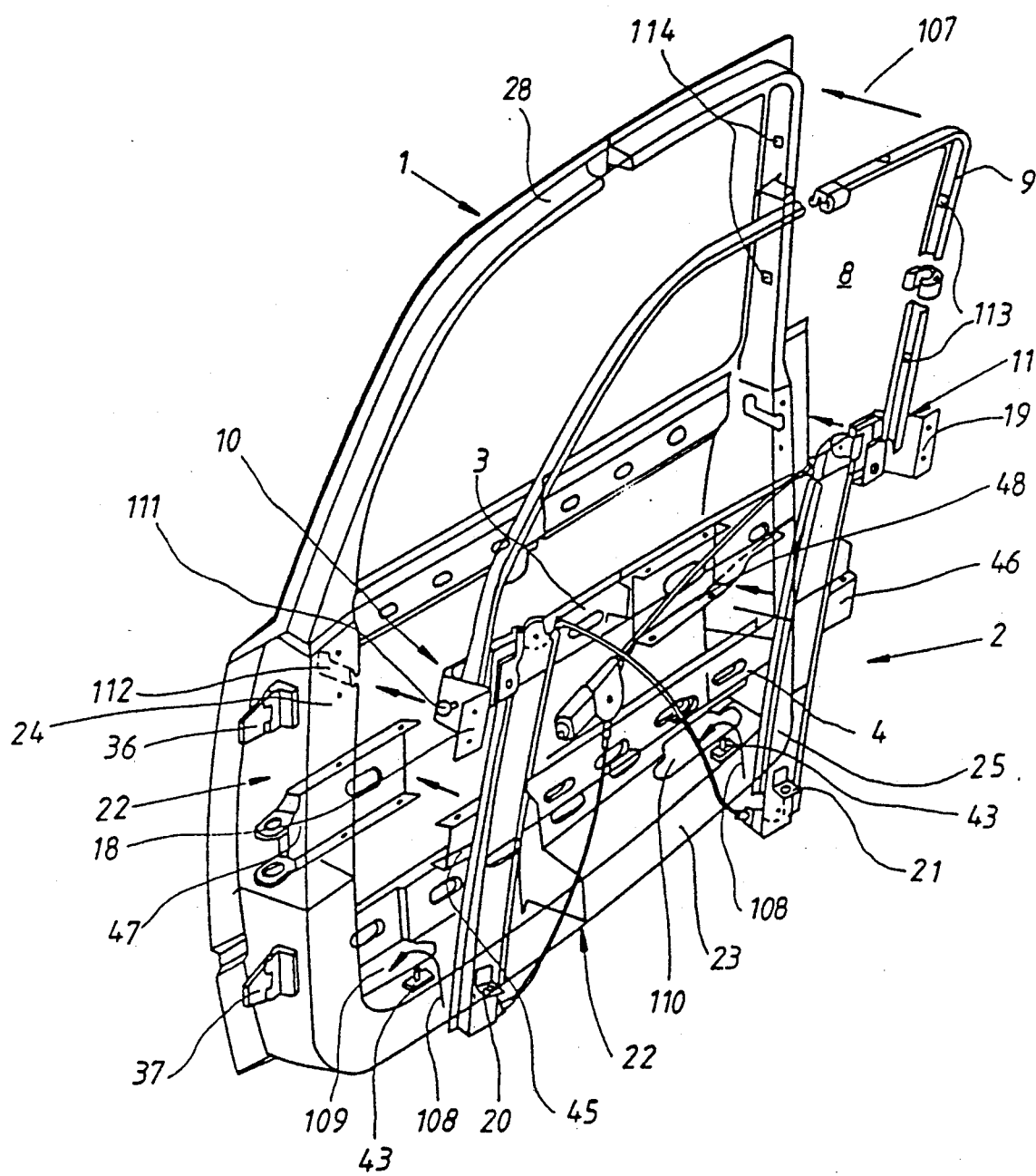
FIG. 5 shows the assembly of a support frame in a motor vehicle door.

FIG. 5 clarifies the installation of support frame 2 in a motor vehicle door 1, with the mounting device being indicated by arrows 107 and 108.

For installation it is necessary first of all to mount support frame 2 in the manner indicated by arrows 108 with the free ends of guide strips 5 and 6 in recesses 109, 110 of base member 23 provided for the purpose. At the same time, threaded bolts 43 connected with base member 23 are introduced into the mounting tabs 20, 21 connected with the free ends of guide rails 5 and 6. Then support frame 2, which is in a diagonal position relative to motor vehicle door 1 is brought by a pivoting movement around base member 23 into the position required for bolting to the frame structure 22 of motor vehicle door 1.

During this pivoting movement, claw pins 111 located in the end areas 10, 11 of upper cross member 3 lock into corresponding recesses 112 on the inner sides of leg members 24 and 25, thus defining the exact position of support frame 2 in motor vehicle door 1. Likewise, simultaneously with the pivoting movement of support frame 2, locking extensions 113 located along the circumference of sealing frame 9 engage corresponding locking openings 114 on the inside of window frame 28 of motor vehicle door 1. Then mounting tabs 18, 19, 20, and 21 of support frame 2 are screwed to motor vehicle door 1, and force inleads 47 and 48 are connected to connecting ends 45 and 46 of tension and compression strip 4.

The assembly described therefore permits simple integration of support frame 2 supplemented by sealing frame 9 into motor vehicle door 1. The combination of support frame 2 and sealing frame 9, by incorporating the complete double cable window lifter system 7 along with window pane 8 creates the possibility of integrating into motor vehicle door 1, a complete module manufactured by a supplier for example, during the assembly of the motor vehicle.

FIG. 6 is a top view of the motor vehicle door and shows the net of the safety module with an integrated double cable for an electric window lifter.

As shown especially clearly in this view, the net is formed of upper cross member 3, tension and compression strip 4, and lower cross member 35 as horizontal net connections and the two guide rails 5 and 6 as vertical net connections, with lower cross member 35 serving to receive the lower ends of guide rails 5 and 6 of the safety module. Tension and compression strip 4 is composed of the individual parts of force inleads 47 and 48 and middle area 53, so that elastic deformability is produced.

Tension and compression strip 4 is connected by force inleads 47 and 48 with A and B pillars of the motor vehicle by a claw connection. The lateral and frontal impact receivers at the center and top thereby form the protective lattice structure for improving the door structure. In the lower area, the structure is formed by mounting the guide rails in the lower cross member.

The outside arrangement of the safety module is shown by the cross section in FIG. 7 through the motor vehicle door along line X—X as shown in FIG. 6 and shows that the safety module which is the net composed of upper cross member 3, tension and compression strip 4, and left guide rail 5 and right guide rail 6 is located between door outer skin 30 and window pane guide 130. This outside arrangement creates a protective zone as a net connection and produces the maximum possible protection for the occupants by its location far outward.

In addition, the outward location of the safety module produces a space-saving design, so that in the interior of the door, cavities and spaces are created for protective elements such as cushions, foam, airbags and the like and for additional storage space. In addition, this arrangement means that no metal components are located in the interior of the motor vehicle door, so that danger of injury to the occupants by sharp, pointed metal parts can be eliminated.

FIG. 7 shows the arrangement of protective body 132 and its integration into the door as well as door inner lining 133, 134, and this view shows especially clearly that, because of the arrangement for support frame 2 which consists essentially of upper cross member 3, tension and compression strip 4, and guide rails 5 and 6 which connect the later together, a spacious door interior 131 is freely available for use between a window pane plane 130 and door outer skin 30. FIG. 7 shows the use of this door interior 131 to accommodate a flexible occupant side protector in the form of an airbag system 132 known of itself. Of course, door interior 131 can also be used to accommodate other types of occupant protection systems or merely a storage space.

As the views in FIGS. 6 and 7 clearly show, support frame 2 is designed as a net with a lattice structure and is located far outward from the occupants between the outer skin and the window pane, in order thereby to participate early on in the energy reduction process, in other words to catch the impact like a net. This permits maximum possible protection for the occupants.

Another effect of the support frame according to the invention is that it provides a space-saving design so that cushions to protect the occupants can be accommodated in the interior of the door. In addition, the outward location of support frame 2 prevents metal components from being inside the door interior. If the occupants strike the body of the door as a result of reactive forces and inertia, metal parts will not be able to cause or contribute to injuries.

Providing an additional inflatable cushion as a safety zone creates another area which serves to take up lateral impact energy.

FIG. 8 is a schematic diagram showing the action of such a soft safety zone 150 in the interior of the door during a lateral impact received in the direction of the arrow.

By mounting an inflatable safety cushion 132 made of foam to protect the occupants or, as an alternative arrangement, an airbag in the vicinity of door inner lining 133, 134, in the event of a lateral impact the cushion is inflated as shown by the arrows inside it, so that an expanded cross section is created in the lower area of the door and an additional impact area is created in the vicinity of the window. Therefore, as a result of a reactive movement of an occupant 140 in the direction of the arrows drawn on occupant 140, a soft safety zone 150 is created which serves to collect the energy which develops during the lateral impact and dissipate it through elastic deformation of the safety cushion or airbag.

At the same time this prevents motor vehicle occupant 140 from coming in contact with sharp or pointed metal parts which could increase the danger of injury. In addition, by lengthening the safety cushion into the area of window pane 8, head area 141 of occupant 140 is prevented from coming in contact with a window pane 8 that might be broken.

FIGS. 9 and 10 show a cross section of two possible embodiments of the connection of a sealing frame 115 and 116 with a window frame 117, 118.

In the design shown in FIG. 9, sealing frame 115 has locking projections 119 which, because of their relative inclined position relative to a sealing frame base 120, lock during assembly into a locking opening 114 behind a mounting bead 122, and therefore exert a locking action contrary to the mounting direction indicated by arrow 121. The connection thus created between window frame 117 and sealing frame 115 is therefore not releasable.

The design of the connection shown in FIG. 10 between window frame 118 and sealing frame 116 on the other hand is releasable opposite to the mounting direction shown by arrow 123. For this purpose, sealing frame 116 has a projection 125 projecting out of its sealing frame base 124, said projection, during assembly, locking by a locking nose 133 into a locking opening 126 and window frame 118. Locking nose 133 is so designed that this locking connection is releasable even opposite the mounting direction. Therefore this design has the advantage that, without using special mounting elements, for example for repairs, simple release and subsequent fitting together again of the connection between sealing frame 116 and window frame 118 is possible.

Sealing frames 115, 116 shown in FIGS. 9 and 10 are each provided with a seal 127. Seal 127 is positively connected with sealing frame 115 or 116, and has a window sealing area 128 designed to be essentially U-shaped in cross section to provide a seal against window pane 8, which blends into a door sealing area 129 facing the interior of the door. To increase the sealing action, the door sealing area 129 has an enclosed hollow cross section.

Figure 11:
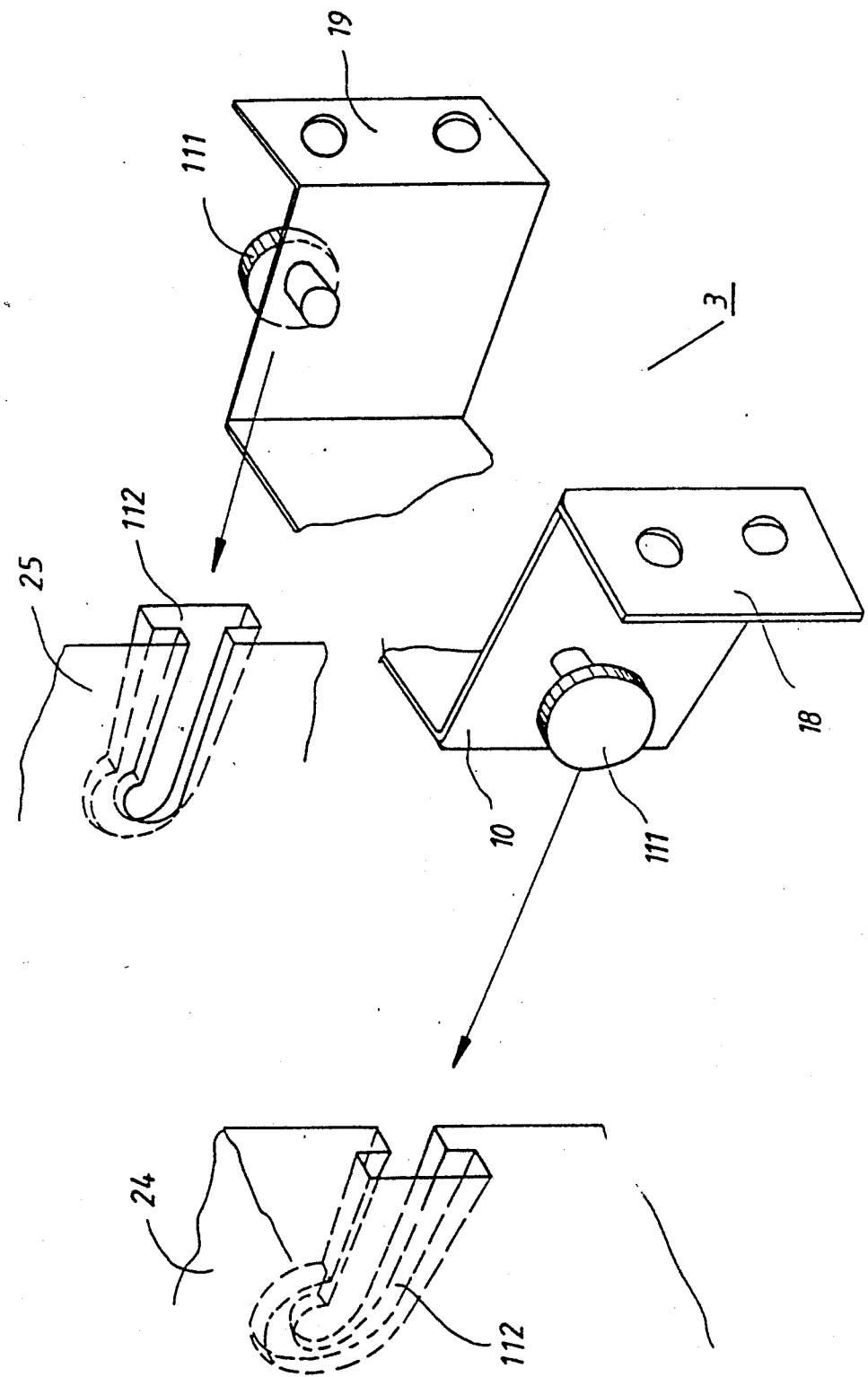
FIG. 11 is an exploded view of the claw connection for a frontal and side impact between the door body and the upper cross member.

FIG. 11, in a perspective exploded view, shows the claw connections between upper cross member 3 in the forward and rear area with the door structure of left and right leg members 24, 25.

The upper cross member in the vicinity of its long ends has claw pins 111 which are inserted into matching recesses 112 in leg members 24, 25. The inner areas of recesses 112 have an elevation so that in a safety module inserted into the door structure, claw pins 111 abut leg members 24, 25 in this area, so that the door structure is involved in energy reduction for further safety during side and frontal impacts.

After the net type safety module with claw-locking principle has been installed in the door structure, upper cross member 3, by means of mounting tabs 18, is connected to the upper ends of leg members 24, 25 using screws 42 as shown in FIG. 1.

Figure 12:
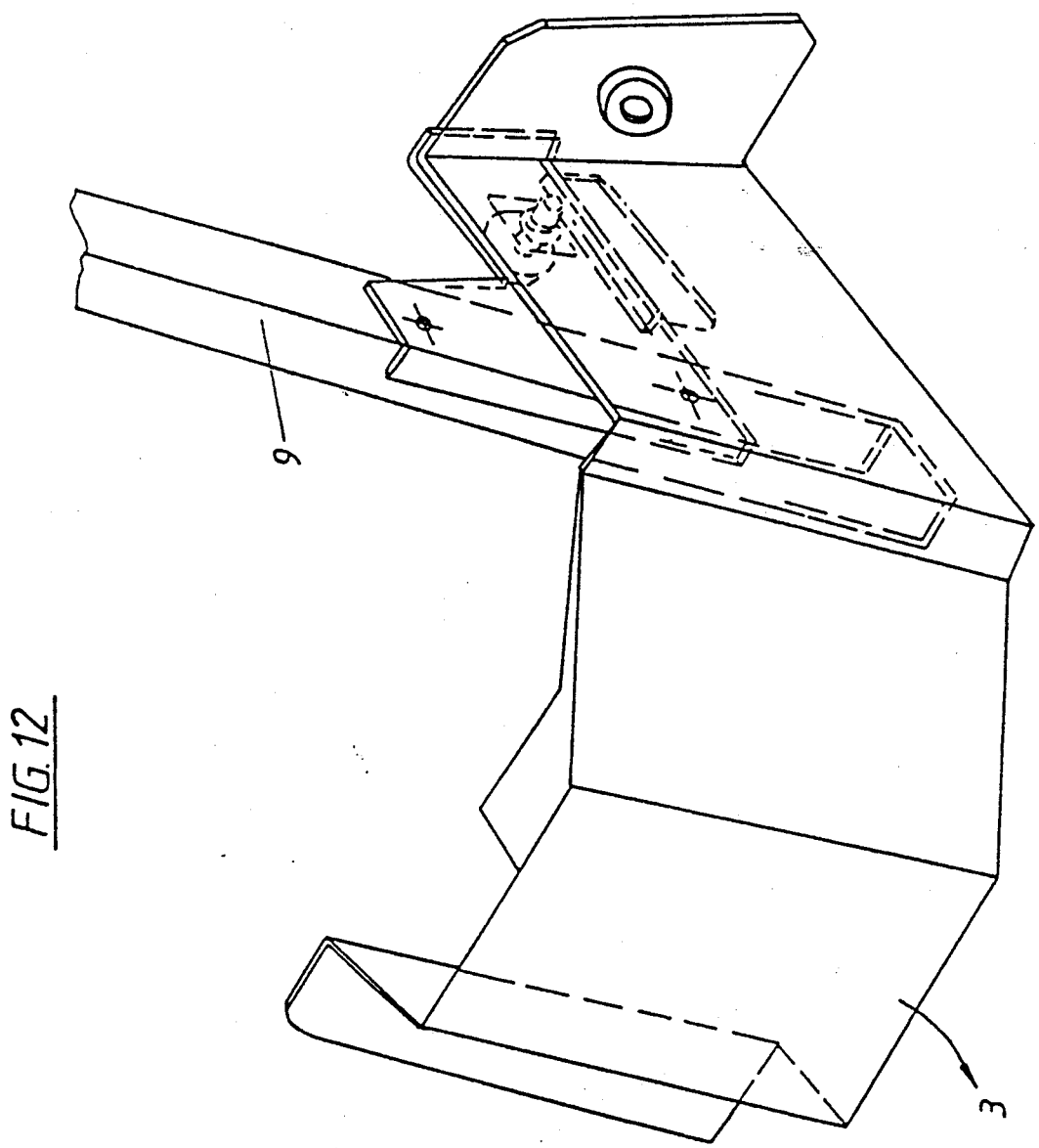
FIG. 12 is a perspective view of the connection of the sealing frame with the upper cross member.

FIG. 12 is a perspective view showing the connection of sealing frame 9 to upper cross member 3 of the safety module with a net structure and a claw-locking principle, whereby sealing frame 9, integrated into the complete safety system, makes the safety module as a whole additionally rigid and by hooking into the door frame after assembly forms an integrated safety system along with the net. FIG. 12 shows the incorporation of the sealing frame into the safety system in the vicinity of the B pillar of the motor vehicle.

The invention is not limited in its implementation to the preferred embodiments described above. Instead, a plurality of versions which make use of the solution shown, even in fundamentally altered designs, is possible.

We claim:

1. Motor vehicle door comprising an outer door assembly, hinge structure secured to said outer door assembly for pivotally attaching the outer door assembly to the passenger compartment of the motor vehicle and force inlead structure secured to said outer door assembly, said force inlead structure being in positive contact with areas of the passenger compartments to either side of the motor vehicle door, and a support frame in the form of a lattice integrated into said outer door assembly, said support frame said support frame including an upper support member running lengthwise of said support frame, a tension and compression support member running lengthwise of said support frame, spaced guide rails connected to said support members, said guide rails being components of a window lifter system and serving to guide a window pane disposed in the motor vehicle door and forming a boundary of said support frame facing the interior of the motor vehicle, at least one of said support members being connected at its connecting ends with said force inlead structure, said support frame being disposed in the area between said window pane of the motor vehicle door and said outer door assembly in such manner that said support frame directly receives the impact forces following a lateral impact.

2. The motor vehicle door of claim 1 and further including an elastically deformable occupant protection device disposed in the door interior between said window pane and a door inner lining.

3. The motor vehicle door of claim 2 wherein said elastically deformable occupant protection device includes an inflatable cushion or an airbag which is preferably so designed that in addition to increasing its cross section in the direction of the occupants, a portion of said elastically deformable occupant protection device, in the event of a lateral impact, extends in the direction of said window pane.

4. The motor vehicle door of claim 1 wherein said outer door assembly includes an essentially U-shaped frame structure that receives said support frame and is composed of a horizontal base member and two leg members perpendicularly adjacent thereto, said upper support member of said support frame being connected at its ends with said leg members and said guide rails being connected at their lower ends with said base member.

5. The motor vehicle door of claim 4 wherein said force inlead structure includes a member mounted on the hinge side of said motor vehicle door and pivotable in its end area facing said passenger compartment pillar structure, and further including a mounting part matched to the cross section of said pillar structure, said mounting part, in its end area facing the motor vehicle door being provided with a pivot pin that extends perpendicularly, said pivot pin being disposed flush with a hinge axis of the motor vehicle door formed by said hinge structure.

6. The motor vehicle door of claim 5 wherein said force inlead structure further includes a member disposed on the lock side of said motor vehicle door and linked at its end area facing passenger compartment pillar by a positive connection releasable in the door opening direction, and further including a mounting part matched to the cross section of said pillar structure, said mounting part being provided at its end area facing the motor vehicle door with a pin pointing in the door opening direction, and the end area of said force inlead member having a mounting eye aligned perpendicularly to said pin.

7. The motor vehicle door of claim 6 wherein each said mounting eye has a recess that is much larger than the diameter of the pin disposed therein so that each said eye is in contact only on the adapter side over a relatively small contact area with its pin.

8. The motor vehicle door of claim 4 and further including an elastically deformable occupant protection device disposed in the door interior between said window pane and a door inner lining, said elastically deformable occupant protection device including an inflatable cushion or an airbag which is preferably so designed that in addition to increasing its cross section in the direction of the occupants, a portion of said elastically deformable occupant protection device, in the event of a lateral impact, extends in the direction of said window pane.

9. A motor vehicle door connected by hinges with a passenger compartment, said door including an outer door assembly with force inlead structure in positive contact with pillar structure of the passenger compartment adjoining the motor vehicle door and an integrated, lattice-type support frame that includes a tension and compression strip and that receives a window lifter, said support frame being mounted in said outer door assembly with said force inlead structure receiving the connecting ends of said tension and compression strip of said support frame and articulated to adapter structure connected with said passenger compartment pillar structure.

10. The motor vehicle door of claim 9 wherein said force inlead structure includes a member mounted on the hinge side of said motor vehicle door and pivotable in its end area facing said passenger compartment pillar structure, and said adapter structure has a mounting part matched to the cross section of said pillar structure, said mounting part, in its end area facing the motor vehicle door being provided with a pivot pin that extends perpendicularly, said pivot pin being disposed flush with a hinge axis of the motor vehicle door formed by said hinge structure and the end area of said force inlead member having two parallel horizontal pivot eyes for mounting said adapter.

11. The motor vehicle door of claim 9 wherein said force inlead structure includes a member disposed on the lock side of said motor vehicle door and linked at its end area facing passenger compartment pillar by a positive connection releasable in the door opening direction, and said adapter structure has a mounting part matched to the cross section of said pillar structure, said mounting part being provided at its end area facing the motor vehicle door with a pin pointing in the door opening direction, and the end area of said force inlead member having a mounting eye aligned perpendicularly to said pin, said eye receiving a pin of said adapter structure, and said adapter structure having, at its opposite end area, a vertically extending articulation pin.

12. The motor vehicle door of claim 11 wherein said mounting eye has a recess that is much larger than the diameter of the pin disposed therein so that said eye is in contact only on the adapter side over a relatively small contact area with its pin.

13. The motor vehicle door of claim 11 wherein said mounting eye is designed as an elongated hole in a force inlead member on the lock side, the edge of said elongated hole is convex, and the pin engaging said mounting eye tapers conically in the door opening direction.

14. The motor vehicle door of claim 9 and further including spaced guide rails connected to said support members, said guide rails being components of a window lifter system and serving to guide a window pane disposed in the motor vehicle door and forming a boundary of said support frame facing the interior of the motor vehicle, and wherein said force inlead structure has crimp structure to receive said tension and compression strip such that said tension and compression strip is staggered with respect to the mounting plane of said force inlead structure on the side of guide rails facing away from the passenger compartment.

15. The motor vehicle door of claim 9 wherein each connection between said tension and compression strip and said force inlead structure receiving its connecting ends is produced by two parallel pins spaced apart from one another in the lengthwise direction of said tension and compression strip.

16. The motor vehicle door of claim 9 said support frame includes an upper cross member, and wherein a positive claw connection is provided between said upper cross member and said tension and compression strip on the one hand and guide rails of a double cable window lifter system on the other hand, each said claw connection consisting of claw parts connected with said guide rails, said claw parts engaging said upper cross member and said tension and compression strip.

17. The motor vehicle door of claim 16 wherein said claw connection consists of claw pins in said upper cross member and corresponding recesses in left and right leg members of said outer door assembly.

18. The motor vehicle door of claim 9 wherein said support frame includes an upper support member running lengthwise of said support frame, and a sealing frame abutting said upper support member for integration of a window pane, disposed in the motor vehicle door and connected with a double cable window lifter system, said sealing frame having an essentially U-shaped profile and locking projection structure for securing said sealing frame in said outer door assembly.

* * * * *